United States Patent
Weber et al.

(10) Patent No.: US 6,744,574 B2
(45) Date of Patent: Jun. 1, 2004

(54) MOUNT FOR AN OPTICAL ELEMENT IN AN OPTICAL IMAGING DEVICE

(75) Inventors: Ulrich Weber, Ulm (DE); Jochen Becker, Rengsdorf (DE); Hubert Holderer, Koenigsbronn (DE); Bernhard Gellrich, Aalen (DE); Jens Kugler, Heubach (DE)

(73) Assignee: Carl Zeiss Semiconductor Manufacturing Technologies AG, Oberkochen (DE)

( * ) Notice: Subject to any disclaimer, the term of this patent is extended or adjusted under 35 U.S.C. 154(b) by 31 days.

(21) Appl. No.: 10/247,964

(22) Filed: Sep. 20, 2002

(65) Prior Publication Data

US 2003/0058551 A1 Mar. 27, 2003

(30) Foreign Application Priority Data

Sep. 22, 2001 (DE) .......................................... 101 46 863

(51) Int. Cl.[7] ................................................. G02B 7/02
(52) U.S. Cl. ........................................ 359/819; 359/830
(58) Field of Search ................................ 359/811, 819, 359/820, 822, 823, 830

(56) References Cited

U.S. PATENT DOCUMENTS

| 5,024,509 | A | * | 6/1991 | Kurihara | 359/741 |
|---|---|---|---|---|---|
| 6,307,688 | B1 | | 10/2001 | Merz et al. | 359/819 |
| 6,392,824 | B1 | * | 5/2002 | Holderer et al. | 359/819 |
| 6,392,825 | B1 | | 5/2002 | Trunz et al. | 359/819 |
| 6,525,888 | B2 | * | 2/2003 | Schletterer | 359/822 |
| 2002/0021504 | A1 | * | 2/2002 | Bayer et al. | 359/827 |

* cited by examiner

Primary Examiner—Huy Mai
(74) Attorney, Agent, or Firm—Welsh & Katz, Ltd.

(57) ABSTRACT

A mount for an optical element in an optical imaging device, in particular in a lens system (4) for semiconductor lithography, has at least one mounting ring (2) which bears the optical element (6). The mounting ring (2) is of at least partially hollow design in cross section.

14 Claims, 1 Drawing Sheet

MOUNT FOR AN OPTICAL ELEMENT IN AN OPTICAL IMAGING DEVICE

BACKGROUND OF THE INVENTION

1. Field of the Invention

The invention relates to a mount for an optical element in an optical imaging device, having at least one mounting ring which bears the optical element according to the preamble of claim 1.

2. Description of the Related Art

It is known from DE 198 59 634 A1 and DE 199 04 152 A1, for example, that mounting rings for optical elements, in particular for optical elements for semiconductor lithography, where correspondingly high levels of accuracy are required, are designed such that an inner mount is attached to an outer ring of the mount via elastic elements. These elastic attachments allow precision adjustment of the position of the optical element, together with a certain isolation of the latter from deformation caused by this precision adjustment. The elastic attachment, however, gives rise to a system which can vibrate, very small eigenfrequencies being produced as a result of a correspondingly large mass of the combination of optical element and inner ring. The optical element can thus, disadvantageously, very easily be caused to vibrate.

It is also disadvantageous that, via the elastic attachments, the outer ring can be subjected to deformation which occurs, for example, when the outer ring is mounted on other mounts or when the lens-system structures connected firmly to the outer ring are mounted on the housing of the lens system. This deformation is then transmitted to the inner ring, in part, by the elastic attachments and may result there in undesired deformation of the optical element. The deformation of the inner ring is manifested here predominantly by bending in the radial and axial directions and by torsion in the tangential direction. In order for this deformation, which can then be transmitted from the inner ring to the optical element, to be kept to as low a level as possible, the inner ring may be designed to be very rigid in relation to this deformation. This inevitably results, however, in comparatively large and heavy inner rings, which further worsen the above-mentioned problems in respect of the low eigenfrequencies.

SUMMARY OF THE INVENTION

The object of the invention is thus to avoid the above-mentioned disadvantages and to provide a lightweight and stable mounting ring which has a very high level of rigidity in respect of radial and axial bending and torsion in the tangential direction.

This object is achieved according to the invention by a mount, wherein the mounting ring is of at least partially hollow design in cross section.

Using a mounting ring which is of at least partially hollow design in cross section can achieve the situation where, with minimal use of mass, a very high geometrical moment of inertia about the radial and axial axes and a high torsional moment of inertia about the tangential axis are achieved. This construction thus makes it possible, according to the invention, to provide a lightweight and nevertheless stable mounting ring and developments.

A particularly favorable embodiment of the invention here provides that the mounting ring, which bears the optical element, forms an inner ring of the mount, said inner ring being connected to an outer ring of the mount via a plurality of elastic elements.

In the case of such a combination which provides a construction which can vibrate, the abovementioned advantages of the mounting ring according to the invention come into play to very good effect. Since the mounting ring, despite its very high level of rigidity, may be of very lightweight design, there is an increase in the eigenfrequency of the combination of optical element and mount when the mounting ring is attached via elastic elements. Since the mounting ring, at the same time, has the very high level of rigidity, which has already been mentioned a number of times, deformation transmitted to it via the elastic attachments is only transmitted to a minimal extent, if at all, to the optical element.

In a further favorable embodiment of the mount, the mounting ring is designed as a hollow profile with a gap-free border region throughout.

Such a design of the hollow profile allows the highest geometrical moments of inertia with the smallest possible amount of material being used. Since the continuous border region does not have any gap, slit or the like, it is thus also possible to optimize, in addition to the two geometrical moments of inertia in respect to radial and axial bending, the torsional moment of inertia in respect of the mass of material used.

Furthermore, the inventors have found that, in a particularly favorable development of the invention, the mounting ring should have a ratio between its radial width and its axial height of from 0.25 to 1.

Dimensions which have such a ratio of width to height of from 0.25 to 1 make it possible to achieve the highest geometrical moments of inertia for the design of the mounting ring. It is more or less immaterial here as to whether the cross section is rectangular or round in shape.

Further advantageous configurations of the invention can be gathered from the rest of the subclaims and from the exemplary embodiments illustrated hereinbelow with reference to the drawing, in which:

DETAILED DESCRIPTION

Figure 1:
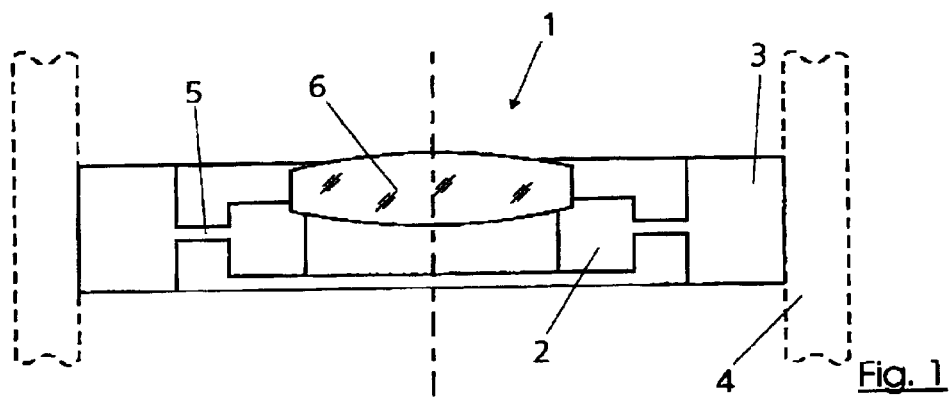
FIG. 1 shows a construction of a mount comprising two concentrically arranged mounting rings and an optical element.

FIG. 1 shows a mount 1 which, in the exemplary embodiment illustrated here, comprises an inner mounting ring 2 and an outer mounting ring 3, the latter being connected firmly to the housing of a lens system 4 (only indicated by dashed lines in FIG. 1) or the like. Arranged between the two mounting rings 2, 3, which are illustrated in principle here, are attachments 5 which may be designed, for example, as resilient elements, as articulations or solid-state articulations with a connecting web or the like. The task of these elastic attachments 5, said task being known per se, is to isolate the two mounting rings 2, 3 from one another in respect of deformation. The optical element, in the exemplary embodiment illustrated here a lens 6, is then fitted firmly in the inner mounting ring 2. The unit comprising lens 6 and inner mounting ring 2, on account of the attachment 5, by means of the elastic elements or articulations, in relation to the outer mounting ring 3 and thus in relation to the housing of the lens system 4, forms a structure which is capable of vibrating and, on account of its mass, has a corresponding eigenfrequency.

In the preferred application for the invention illustrated here, namely the use for optical elements for semiconductor lithography, the mass of the combination of lens 6 and inner mounting ring 2 will be comparatively high since such lenses as are used in semiconductor lithography mostly have a comparatively large diameter and thus a large mass. In order, then, to minimize the deformation to which the lens is subjected, it is, accordingly, also necessary for the inner mounting ring 2 to be of very large and stiff design. In the case of the customary configurations which have been conventional hitherto, this means that the inner mounting ring 2 has to have a comparatively large cross section and thus, on account of its solid design, likewise results in the combination of the lens 6 and the inner mounting ring 2 having a very high mass.

On account of the resulting very high mass in the combination of lens and inner mounting ring, the eigenfrequency of this combination will become very small. The combination can thus very easily be caused to vibrate and, even at very small frequencies, undergoes resonant vibration, which may involve anything from severe mechanical damage to malfunctioning.

Figure 2:
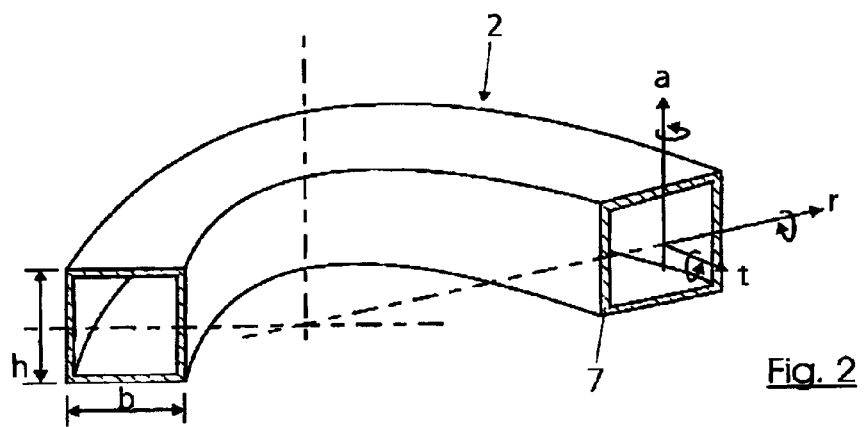
FIG. 2 shows a possible embodiment of a mounting ring.

In order, then, to increase the rigidity of the inner mounting ring 2 in relation to deformation to which it is subjected, the inner mounting ring 2 is of at least partially hollow design. In the exemplary embodiment illustrated in FIG. 2, it is configured as a hollow profile. The deformation to which the mounting ring 2 is predominantly subjected is indicated in principle in FIG. 2, this deformation being, on the one hand, the axial bending a and the radial bending r and, on the other hand, the tangential torsion t. In order to counteract this deformation, the highest possible geometrical moment of inertia or torsional moment of inertia has to be provided for the respective direction. The hollow profile used here for the inner mounting ring 2 fulfills this task very well. The best results can be achieved here if the width b of the hollow profile In relation to the height h of the hollow profile is such that the quotient of the width b and height h assumes values of between 0.25 and 1. The shape illustrated here by way of example is generally a rectangular, and in the limiting case square, cross section. In accordance with the physical conditions in the case of the geometrical and torsional moments of inertia, it is possible to achieve the best results in respect of optimizing rigidity in relation to mass if the mounting ring 2 is configured as a hollow profile with a gapfree border region 7 throughout, the mass of the ring being arranged in said border region. This makes it possible to achieve a very stiff and nevertheless comparatively lightweight mounting ring 2 which raises the eigenfrequency of the combination of lens 6 and inner mounting ring 2 by virtue of the mass of this combination being correspondingly lowered and which, on account of its high level of rigidity, at the same time reduces the amount of deformation to which the lens 6 is subjected.

As has already been mentioned above, the border region of the hollow profile should be of gap-free or closed design since the torsional moment of inertia t in particular would drop greatly if a slit or the like were to be arranged in the border region 7.

Figure 3:
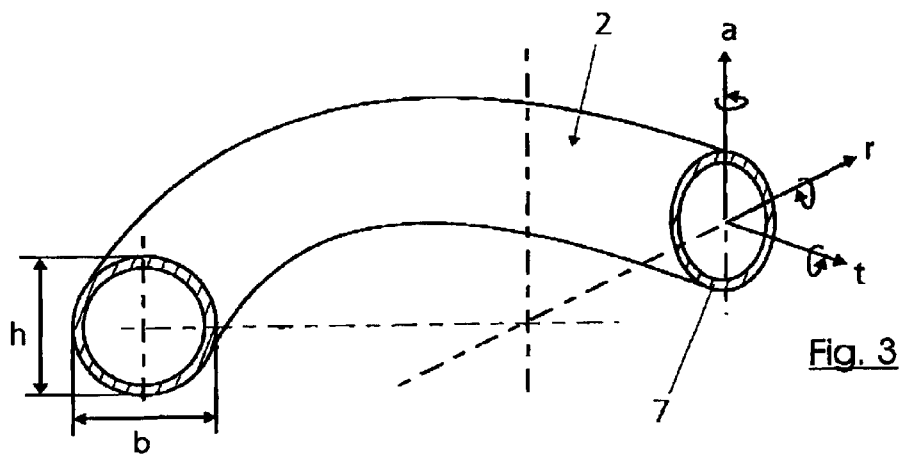
FIG. 3 shows an alternative embodiment of a possible mounting ring.

The definitive shape of the hollow-profile cross section may also be varied here by means of the conventional design measures. Thus, for example, FIG. 3 shows an alternative embodiment of the inner mounting ring 2 in which an elliptical cross section has been selected. The ratio of width b to height h, which should, if possible, be between 0.25 and 1, applies here too, with the result that an annular cross section is achieved here too in the limiting case.

Of course, this advantageous configuration of the inner mounting ring 2 need not be restricted to the preferred exemplary embodiment of a mount having an inner mounting ring 2 and an outer mounting ring 3 which are connected via elastic elements 5. It is also the case when using just a single mounting ring 2 that it is possible, by virtue of the increase in the rigidity in relation to the deformation and the reduction in the mass of the mounting ring 2, to achieve a corresponding advantage, which likewise results in reduced deformation for the optical element, in this case the lens 6.

What is claimed is:

1. A mount for an optical element in an optical imaging device, having at least one mounting ring which bears the optical element, wherein said mounting ring is of at least partially hollow design in cross section.

2. The mount as claimed in claim 1, wherein said mounting ring is designed as a hollow profile with a gap-free border region throughout.

3. The mount as claimed in claim 1, wherein a ratio of a radial width of said mounting ring to a axial height of said mounting ring is between 0.25 and 1.

4. The mount as claimed in claim 1, wherein said mounting ring, which bears said optical element, forms an inner ring of the mount, said inner ring being connected to an outer ring of the said mount via a plurality of elastic elements.

5. The mount as claimed in claim 4, wherein said inner mounting ring and said outer mounting ring are arranged concentrically in relation to one another.

6. The mount as claimed in claim 1, wherein the said mounting ring has a rectangular cross section.

7. The mount as claimed in claim 1, wherein said mounting ring has an elliptical cross section.

8. A lens system for semiconductor lithography having at least one optical element in a mount with at least one mounting ring which bears the optical element, wherein said mounting ring is of at least partially hollow design in cross section.

9. The lens system for semiconductor lithography as claimed in claim 8, wherein said mounting ring is designed as a hollow profile with a gap-free border region throughout.

10. The lens system for semiconductor lithography as claimed in claim 8, wherein a ratio of a radial width of said mounting ring to an axial height of said mounting ring is between 0.25 and 1.

11. The lens system for semiconductor lithography as claimed in claim 8, wherein said mounting ring, which bears the optical element, forms an inner ring of said mount, said inner ring being connected to an outer ring of said mount via a plurality of elastic elements.

12. The lens system for semiconductor lithography as claimed in claim 11, wherein said inner mounting ring and said outer mounting ring are arranged concentrically in relation to one another.

13. The lens system for semiconductor lithography as claimed in claim 8, wherein said mounting ring has a rectangular cross section.

14. The lens system for semiconductor lithography as claimed in claim 8, wherein said mounting ring has an elliptical cross section.

* * * * *